United States Patent
Chen et al.

(10) Patent No.: US 12,332,847 B1
(45) Date of Patent: Jun. 17, 2025

(54) DYNAMICALLY REMOVING DUPLICATE CONTAINER IMAGE LAYERS

(71) Applicant: International Business Machines Corporation, Armonk, NY (US)

(72) Inventors: Xiao Ling Chen, Beijing (CN); Si Yu Chen, Beijing (CN); Heng Wang, Beijing (CN); Bo Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/789,943

(22) Filed: Jul. 31, 2024

(51) Int. Cl.
*G06F 16/174* (2019.01)
*G06F 3/06* (2006.01)

(52) U.S. Cl.
CPC ........ *G06F 16/1748* (2019.01); *G06F 3/0608* (2013.01); *G06F 3/0641* (2013.01); *G06F 3/067* (2013.01)

(58) Field of Classification Search
CPC .. G06F 16/1748; G06F 3/0608; G06F 3/0641; G06F 3/067
See application file for complete search history.

(56) References Cited

U.S. PATENT DOCUMENTS

| | | | |
|---|---|---|---|
| 9,785,643 B1 | 10/2017 | Patil et al. | |
| 10,002,247 B2 | 6/2018 | Suarez et al. | |
| 10,303,499 B2 | 5/2019 | Jobi et al. | |
| 10,303,657 B2 | 5/2019 | Huang et al. | |
| 10,528,366 B2 | 1/2020 | Wong et al. | |
| 10,534,671 B1 | 1/2020 | Zhao et al. | |
| 11,163,728 B2 | 11/2021 | Zheng et al. | |
| 11,803,303 B1 | 10/2023 | Huo et al. | |
| 2018/0341471 A1 | 11/2018 | Stefanov et al. | |
| 2022/0103623 A1* | 3/2022 | Fong | H04L 67/1078 |
| 2023/0315678 A1 | 10/2023 | He et al. | |
| 2024/0012663 A1 | 1/2024 | Yuan et al. | |
| 2025/0125947 A1* | 4/2025 | Miller | H04L 9/0825 |

OTHER PUBLICATIONS

Zhao et al., DupHunter: Flexible High-Performance Deduplication for Docker Registries, received from Applicant via IDS (Year: 2020).*

(Continued)

*Primary Examiner* — Tyler J Torgrimson
(74) *Attorney, Agent, or Firm* — Yee & Associates, P.C.

(57) ABSTRACT

Shared container image layer removal is provided. It is determined whether layer metadata corresponding to a selected layer of a container image includes a referenced image identifier corresponding to a reference shared layer of an other container image stored in local storage based on an analysis of the layer metadata. In response to determining that the layer metadata corresponding to the selected layer does include the referenced image identifier corresponding to the reference shared layer of the other container image stored in the local storage based on the analysis of the layer metadata, it is determined that the selected layer of the container image is a duplicate shared layer having same content as the reference shared layer. The container image containing the selected layer that is the duplicate shared layer is removed from the local storage to decrease space utilization of the local storage and thereby increase performance.

20 Claims, 11 Drawing Sheets

(56) References Cited

OTHER PUBLICATIONS

Hongsheng Luo, Jianfeng Zhang, Yong Guo, Xin Zhao, Yi Ren, and Bao Li "Container image management in cloud-edge environments: an image deletion method based on layer affinity", Proc. SPIE 13486, Fourth International Conference on Computer Vision, Application, and Algorithm (CVAA 2024) (Year: 2025).*

Author unknown, "Delete container images in Azure Container Registry," Oct. 31, 2023, 9 pages, learn.microsoft.com, accessed Jun. 20, 2024, https://learn.microsoft.com/en-us/azure/container-registry/container-registry-delete.

Zhao et al., "DupHunter: Flexible High-Performance Deduplication for Docker Registries," Proceedings of the 2020 USENIX Annual Technical Conference, Jul. 15-17, 2020, pp. 769-783, usenix.org, accessed Jun. 20, 2024, https://www.usenix.org/conference/atc20/presentation/zhao.

Anonymous, "Docker layer share by tag," ip.com, Apr. 16, 2019, IPCOM000258170, 4 pages.

Fan et al., "Gear: Enable Efficient Contaier Storage and Deployent with a New Image Format," ICDCS'21—41st IEEE International Conference on Distributed Computing Systems, Jul. 2021, pp. 1-11, IEEE, Washington DC, United States <hal-03363179>.

Han et al., "Container Image Access Control Architecture to Protect Applications," IEEE Access, Sep. 2, 2020, vol. 8 2020, 10 pages.

Li et al., "Commutativity-guaranteed Docker Image Reconstruction towards Effective Layer Sharing", Proceedings of the ACM Web Conference 2022 (WWW '22) Apr. 25-29, 2022 Virtual Event Lyon France, 9 pages, New York, NY United States <https://doi.org.10.1145/3485447.3512154>.

* cited by examiner

US 12,332,847 B1

DYNAMICALLY REMOVING DUPLICATE CONTAINER IMAGE LAYERS

BACKGROUND

The disclosure relates generally to container-based environments and more specifically to managing container images.

A container-based environment, architecture, platform, or the like, such as, for example, Kubernetes® (a registered trademark of the Linux Foundation of San Francisco, CA, USA), provides a structural design for automating deployment, scaling, and operations of containers across host nodes. A host node is a machine, either physical or virtual, where containers (i.e., application workloads) are deployed. A container is a version of a container image and is ready to run as an application, which corresponds to a service. In other words, the container image becomes the container at runtime. The container image is an executable package of software that includes everything needed to run the application (e.g., code, runtime, system tools, system libraries, settings, and the like).

SUMMARY

According to one illustrative embodiment, a computer-implemented method for shared container image layer removal is provided. A host node determines whether layer metadata corresponding to a selected layer of a container image includes a referenced image identifier corresponding to a reference shared layer of an other container image stored in local storage based on an analysis of the layer metadata. In response to the host node determining that the layer metadata corresponding to the selected layer does include the referenced image identifier corresponding to the reference shared layer of the other container image stored in the local storage based on the analysis of the layer metadata, the host node determines that the selected layer of the container image is a duplicate shared layer having same content as the reference shared layer. The host node removes the container image containing the selected layer that is the duplicate shared layer from the local storage to decrease space utilization of the local storage and thereby increase performance. According to other illustrative embodiments, a computer system and computer program product for shared container image layer removal are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
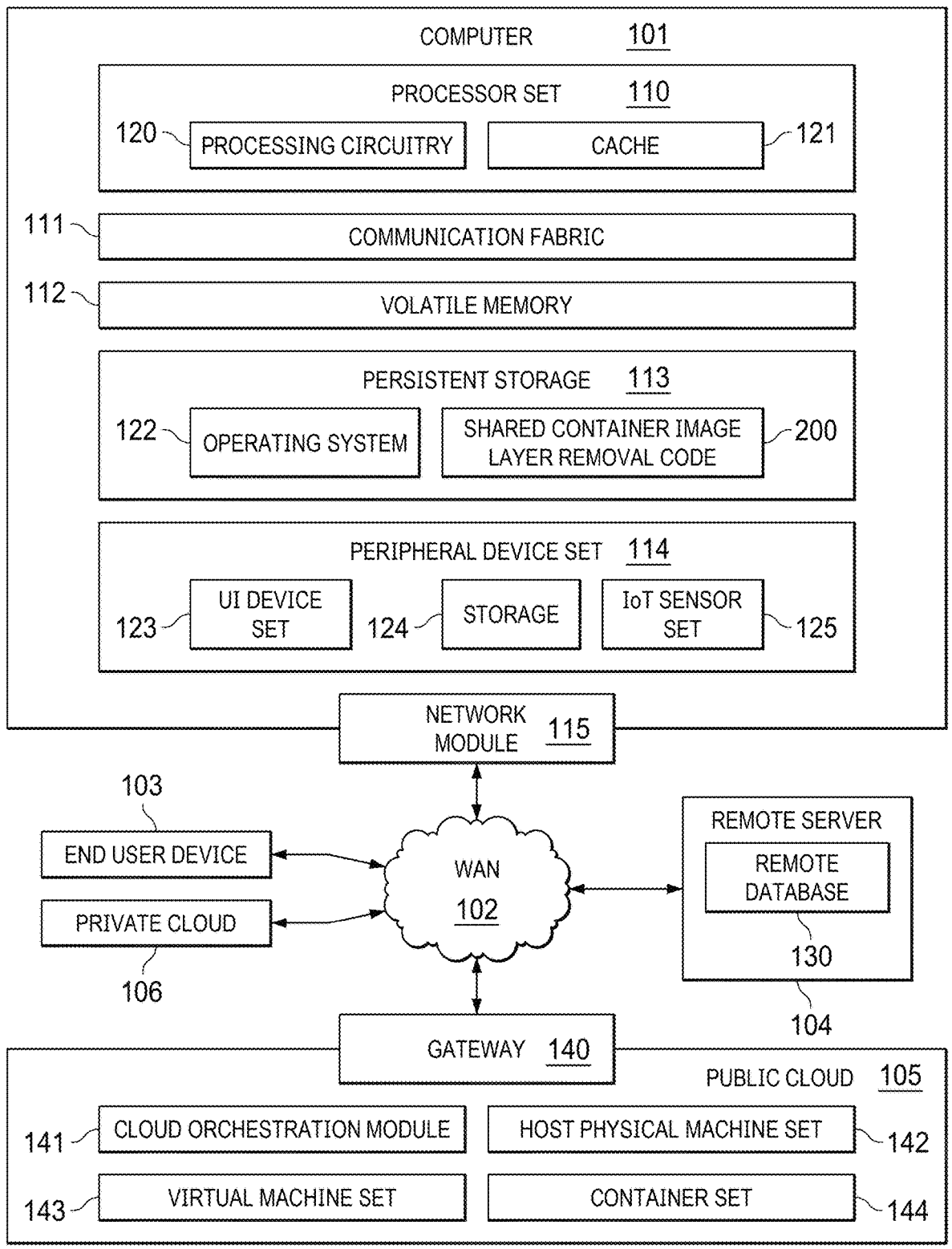
FIG. 1 is a pictorial representation of a computing environment in which illustrative embodiments may be implemented.
Figure 2:
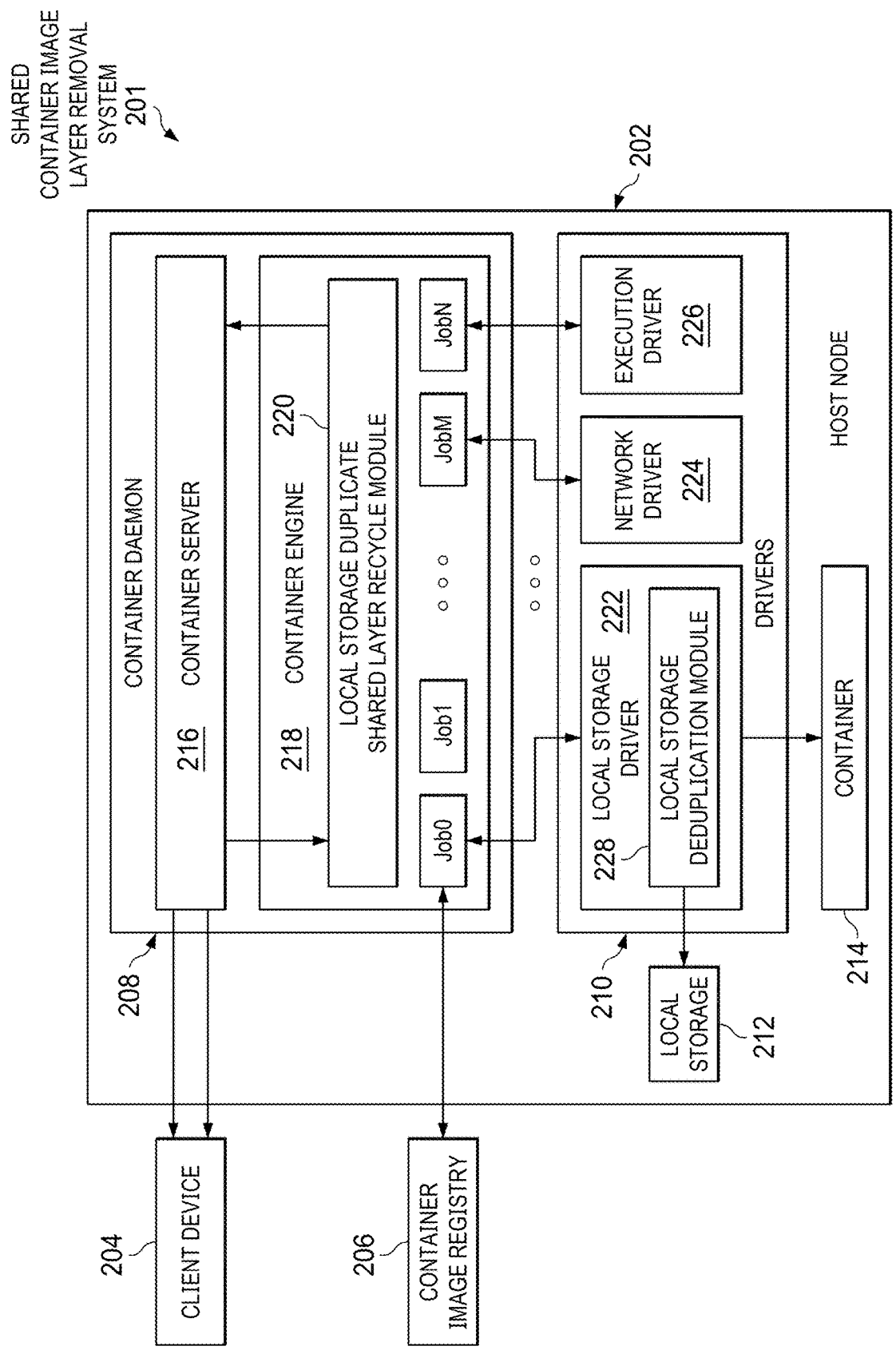
FIG. 2 is a diagram illustrating an example of a shared container image layer removal system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a container-based environment for the execution of at least some of the computer code involved in performing the inventive methods of illustrative embodiments, such as shared container image layer removal code 200. For example, shared container image layer removal code 200 automatically identifies and removes duplicate shared layers located in different container images having different base layers within local storage of host nodes to decrease unnecessary local storage space utilize, and thereby increase computer performance.

In addition to shared container image layer removal code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and shared container image layer removal code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in shared container image layer removal code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a customer of an entity that operates computer 101), and may take any of the forms discussed above in connection with computer 101. EUD 103 typically receives helpful and useful data from the operations of computer 101. For example, in a hypothetical case where computer 101 is designed to provide a service to the end user, this service would typically be communicated from network module 115 of computer 101 through WAN 102 to EUD 103. In this way, EUD 103 can display, or otherwise present, the service to the end user. In some embodiments, EUD 103 may be a client device, such as a thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a set of services using a set of containers corresponding to a set of container images, then the container images may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Based on current container-based technology, when a user pulls two different container images that are based on the same base layer, and both of the container images contain a duplicate shared layer having the same content, the duplicate shared layer is pulled only once and stored as a single copy on local storage of a host node. However, when the user pulls two different container images that are based on different base layers, and both of the container images contain a duplicate shared layer having the same content, the duplicate shared layer is pulled only once, but two copies of the duplicate shared layer are stored on the local storage of the host node.

In an actual software product management scenario, situations exist when multiple different applications need to apply the same software update, similar to the situation above where multiple copies of the duplicate layer are stored on local storage. For example, if the user has different applications installed on the host node and needs to apply the same software update to each of the different applications, then the software update is stored as several duplicate copies, which unnecessarily consumes a large amount of local storage space. This unnecessary consumption of local storage space is particularly prominent in frequently updated, large-scale applications.

Illustrative embodiments automatically and completely remove a reference shared layer corresponding to a plurality of container images in local storage. Each of the plurality of container images has a different base layer with a plurality of layers above the base layer. By removing the reference shared layer corresponding to the plurality of container images, illustrative embodiments decrease local storage utilization thereby increasing host node performance. Illustrative embodiments include a "referenced-image-ID" attribute in layer metadata of a container image layer to record an identifier of the referenced container image corresponding to the duplicate shared layer from the referenced container image. Illustrative embodiments also utilize a local storage deduplication module located in the local storage driver to generate the referenced-image-ID attribute and a reference count corresponding to the reference shared layer in the layer metadata. Illustrative embodiments further utilize a local storage duplicate shared layer recycle module located in the container engine when a delete container image command is invoked to transfer a movable duplicate shared layer lock from the reference shared layer, which is being removed, to one of the duplicate shared layers and then to completely remove or delete the referenced container image, along with the reference shared layer, its reference shared layer difference folder, and its corresponding layer metadata from the local storage of the host device. Furthermore, local storage duplicate shared layer recycle module updates the referenced-image-ID attribute and reference count in the layer metadata of one of the other container images now acting as the referenced container image.

Thus, illustrative embodiments enable the complete removal of the reference shared layer corresponding to different container images having different base layers in local storage after pulling the container images from one or more remote container image registries even though the reference count of the reference shared layer, which was referenced by other duplicate shared layers corresponding to different container images, was greater than zero.

As a result, illustrative embodiments optimize local storage space utilization during container deployment by removing the reference shared layer completely from local storage, especially when managing container images corresponding to multiple applications. In other words, illustrative embodiments provide deduplication of container images, which originated from different base layers, within local storage. The process of illustrative embodiments is transparent to both the developer of the container image and the end user of the container image.

Thus, illustrative embodiments provide one or more technical solutions that overcome a technical problem with current container-based environments that unnecessarily consume large amounts of local storage space by storing duplicate shared container image layers. As a result, these one or more technical solutions provide a technical effect and practical application in the field of container-based environments.

With reference now to FIG. 2, a diagram illustrating an example of a shared container image layer removal system is depicted in accordance with an illustrative embodiment. Shared container image layer removal system 201 may be implemented in a container-based environment, such as computing environment 100 in FIG. 1. Shared container image layer removal system 201 is a system of hardware and software components for automatically identifying and removing duplicate shared layers of different container images having different base layers within local storage of host nodes to decrease unnecessary local storage space utilize.

In this example, shared container image layer removal system 201 includes host node 202, client device 204, and container image registry 206. Host node 202 can be, for example, computer 101 in FIG. 1. Client device 204 can be, for example, EUD 103 in FIG. 1. Container image registry 206 can be, for example, remote database 130 in FIG. 1. However, it should be noted that shared container image layer removal system 201 is intended as an example only and not as a limitation on illustrative embodiments. For example, shared container image layer removal system 201 can include any number of host nodes, client devices, container image registries, and other devices and components not shown.

In this example, host node 202 includes container daemon 208, drivers 210, local storage 212, and container 214. Container daemon 208 provides the runtime environment for containers, such as container 214, running on host node 202. Container daemon 208 includes container server 216 and container engine 218. Container engine 218 includes local storage duplicate shared layer recycle module 220. Container engine 218 utilizes local storage duplicate shared layer recycle module 220 to completely delete a container image, along with its duplicate shared layer, its reference shared layer difference folder, and its corresponding layer metadata from local storage 212 of host node 202 in response to receiving a delete container image command from a user corresponding to client device 204. It should be noted that the difference folder stores any changes in layer content. For example, a new file is added, an existing file is modified, and a previous file is deleted on a particular layer. These changes to that particular layer are stored in the difference folder for that particular layer. In addition, local storage duplicate shared layer recycle module 220 transfers a movable duplicate shared layer lock from the shared layer, which is being deleted with the container image, to another shared layer of another container image now acting as a referenced container image. Further, local storage duplicate shared layer recycle module 220 updates a referenced-image-ID and reference count recorded in layer metadata of the other container image now acting as the referenced container image.

In this example, drivers 210 include local storage driver 222, network driver 224, and execution driver 226. Local storage driver 222 includes local storage deduplication module 228. Local storage driver 222 utilizes local storage deduplication module 228 to generate the referenced-image-ID and reference count in the layer metadata corresponding to a reference shared layer of a referenced container image located in local storage 212.

Host node 202 utilizes container 214 to execute an application workload that provides a service to requesting client device users. Host node 202 runs container 214 using one or more container images stored in local storage 212. Container 214 can represent a plurality of different containers.

Figure 3:
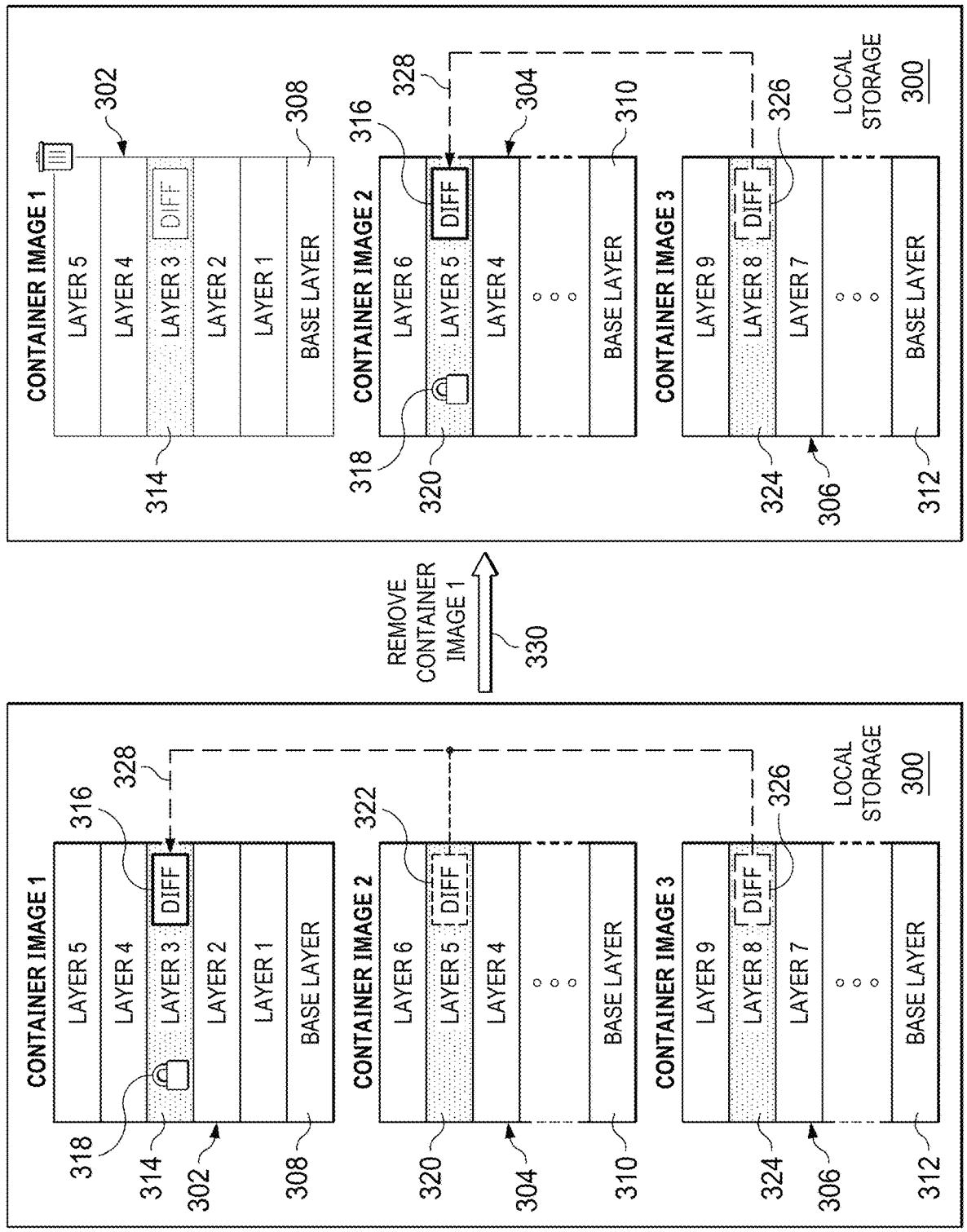
FIG. 3 is a diagram illustrating an example of local storage in accordance with an illustrative embodiment.

With reference now to FIG. 3, a diagram illustrating an example of local storage is depicted in accordance with an illustrative embodiment. Local storage 300 is implemented in a host node, such as, for example, computer 101 in FIG. 1 or host node 202 in FIG. 2. For example, local storage 300 can be persistent storage 113 in FIG. 1 or local storage 212 in FIG. 2.

In this example, local storage 300 includes container image 1 302, container image 2 304, and container image 3 306. Each of container image 1 302, container image 2 304, and container image 3 306 has a plurality of layers. However, each of container image 1 302, container image 2 304, and container image 3 306 has a different base layer, such as base layer 308, base layer 310, and base layer 312, respectively. Also in this example, container image 1 302 includes layer 3 314, container image 2 304 includes layer 5 320, and container image 3 306 includes layer 8 324. Further, it should be noted that layer 5 320 of container image 2 304 and layer 8 324 of container image 3 306 contain the same content as layer 3 314 of container image 1 302 with duplicate layer reference link 328 from layer 5 320 and layer 8 324 to layer 3 314 indicating the layer relationships. As a result, layer 3 314 of container image 1 302 includes reference shared layer difference folder 316, layer 5 320 of container image 2 304 includes duplicate shared layer difference folder 322, and layer 8 324 of container image 3 306 includes duplicate shared layer difference folder 326.

At 330, local storage 300 receives an input to remove container image 1 302. However, when current container-based environments try to remove container image 1 302 from local storage 300, current container-based environments keep the reference shared layer difference folder for layer 3 314 in local storage 300 for container image 1 302 because of the duplicate shared layer references. That is, current container-based environments utilize an immovable shared layer lock on layer 3 314 of container image 1 302 that blocks complete removal of container image 1 302 when the reference count of layer 3 314 is greater than zero (i.e., in this example the reference count of layer 3 314 is two).

In contrast, illustrative embodiments provide movable duplicate shared layer lock 318 that enables illustrative embodiments to remove container image 1 302 along with layer 3 314 safely and completely even though the reference count of layer 3 314 is greater than zero. As a result of removing container image 1 302 along with layer 3 314 at 330, illustrative embodiments transfer reference shared layer difference folder 316 and movable duplicate shared layer lock 318 from layer 3 314 of container image 1 302 to layer 5 320 of container image 2 304 so that layer 5 320 is not acting as the reference shared layer. Consequently, illustrative embodiments update duplicate layer reference link 328 to go from layer 8 324 of container image 3 306 to layer 5 320 of container image 2 304 indicating the new layer relationship.

Figure 4A:
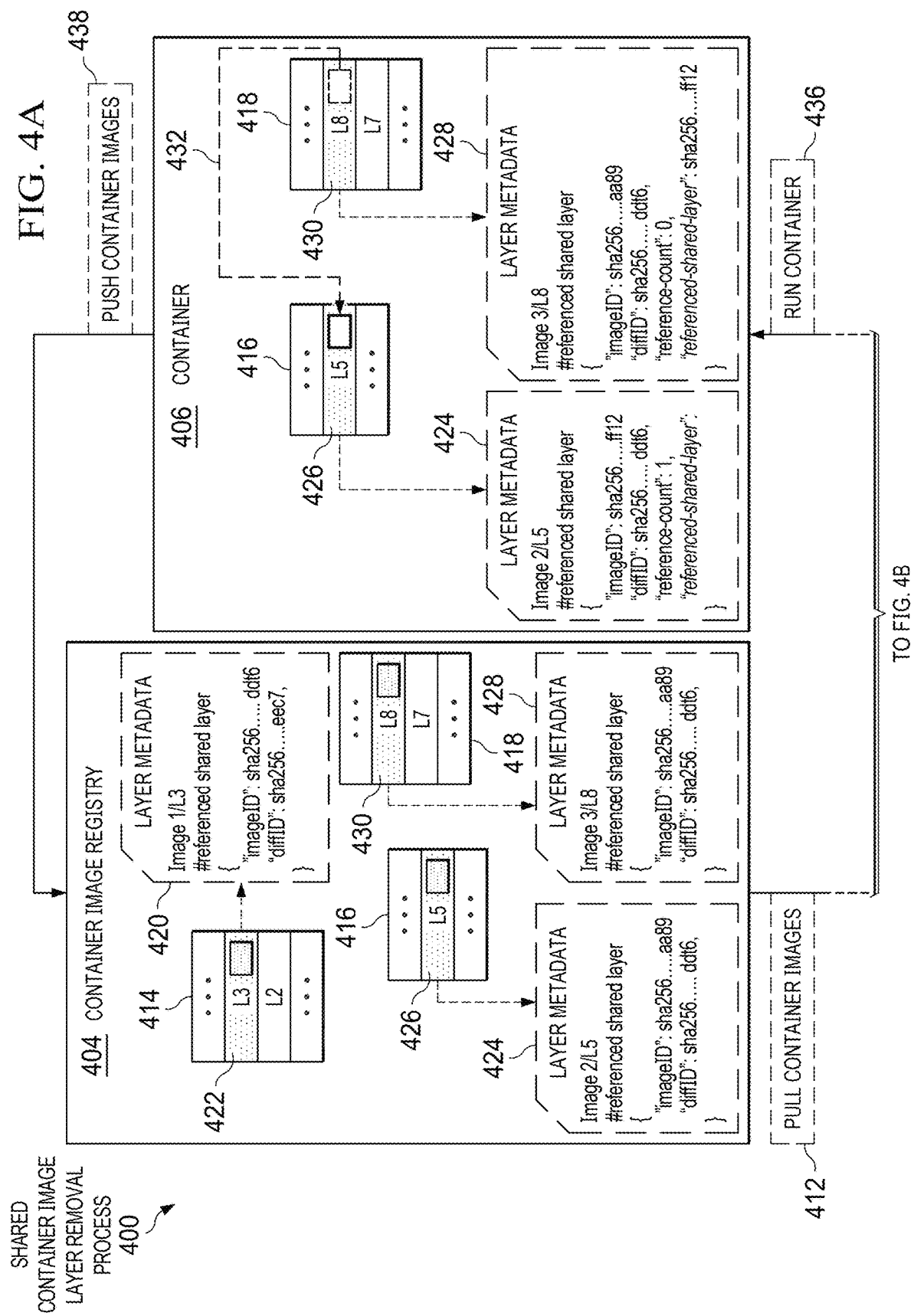
FIGS. 4A-4B are a diagram illustrating an example of a shared container image layer removal process in accordance with an illustrative embodiment.
Figure 4B:
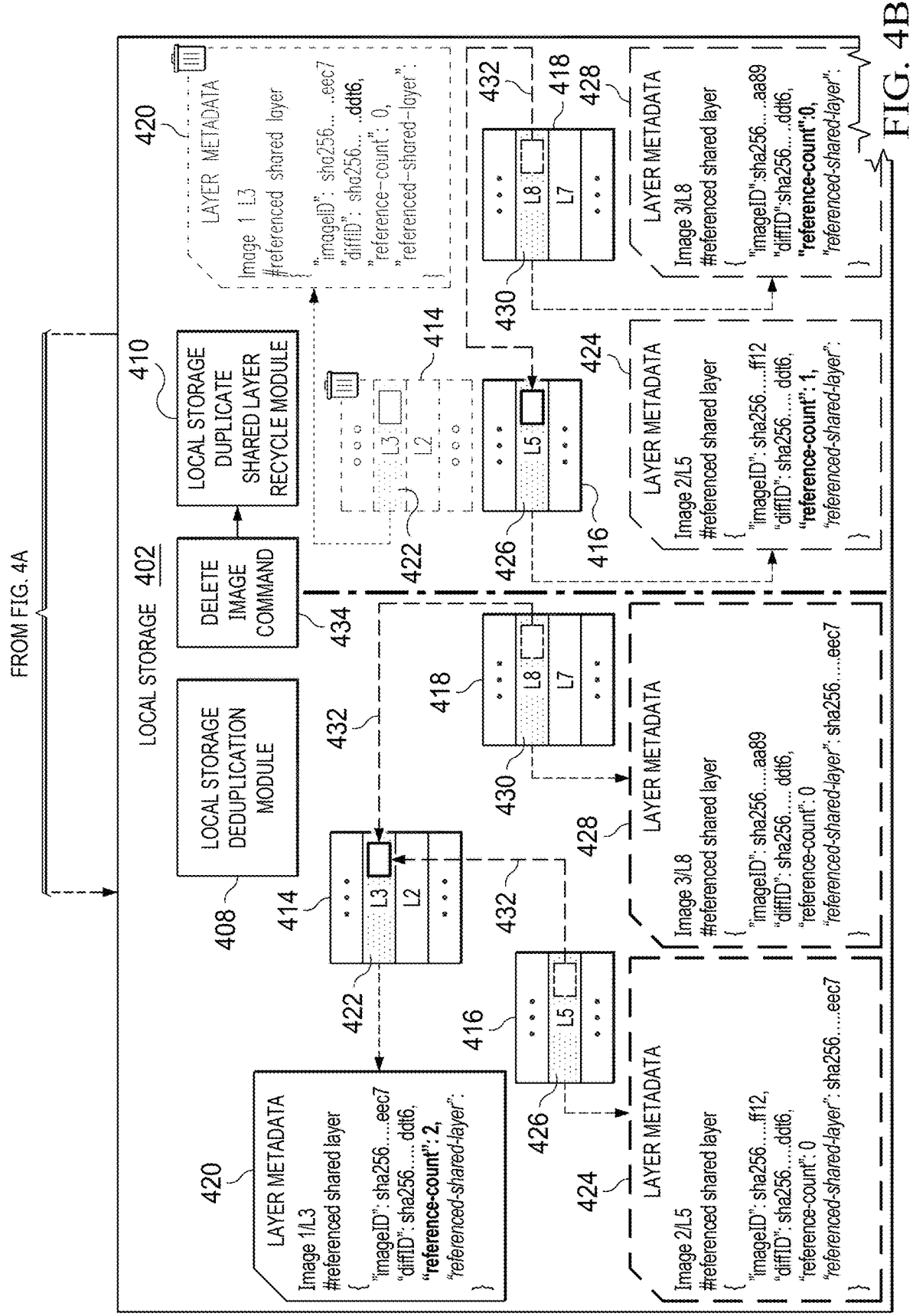

With reference now to FIGS. 4A-4B, a diagram illustrating an example of a shared container image layer removal process is depicted in accordance with an illustrative embodiment. Shared container image layer removal process 400 is implemented in a host node, such as, for example, computer 101 in FIG. 1 or host node 202 in FIG. 2.

In this example, shared container image layer removal process 400 includes local storage 402, container image registry 404, and container 406. Local storage can be, for example, persistent storage 113 in FIG. 1, local storage 212 in FIG. 2, or local storage 300 in FIG. 3. Container image registry can be, for example, remote database 130 in FIG. 1 or container image registry 206 in FIG. 2. Container 406 can be, for example, container 214 in FIG. 2. However, it should be noted that shared container image layer removal process 400 is intended as an example only and not as a limitation on illustrative embodiments. For example, shared container image layer removal process 400 can include any number of local storage, container image registries, containers, and other devices and components not shown.

In this example, local storage 402 includes local storage deduplication module 408 and local storage duplicate shared layer recycle module 410, such as, for example, local storage deduplication module 228 and local storage duplicate shared layer recycle module 220 in FIG. 2. At 412, the host node pulls a set of container images, along with corresponding layer metadata, from container image registry 404. In this example, the set of container images includes container image 1 414, container image 2 416, and container image 3 418, such as, for example, container image 1 302, container image 2 304, and container image 3 306 in FIG. 3. The corresponding layer metadata includes layer metadata 420, layer metadata 424, and layer metadata 428, respectively. Layer metadata 420 contains information regarding layer 3 422 of container image 1 414, layer metadata 424 contains information regarding layer 5 426 of container image 2 416, and layer metadata 428 contains information regarding layer 8 430 of container image 3 418. Layer 3 422, layer 5 426, and layer 8 430 can be, for example, layer 3 314, layer 5 320, and layer 8 324 in FIG. 3.

In this example, the host node generates a layer relationship from layer 5 426 and layer 8 430 to layer 3 422 as indicated by duplicate layer reference link 432, such as, for example, duplicate layer reference link 328 in FIG. 3. Layer 5 426 and layer 8 430 both include a duplicate shared layer difference folder, such as duplicate shared layer difference folders 322 and 326 in FIG. 3, and layer 3 422 includes a reference shared layer difference folder, such as reference shared layer difference folder 316 in FIG. 3.

At 434, the host node receives a delete image command to remove container image 1 414 from local storage 402. As a result, the host node removes container image 1 414 along with layer 3 422 and layer metadata 420 from local storage 402, transfers the reference shared layer difference folder from layer 3 422 to layer 5 426, and updates duplicate layer reference link 432 to go from layer 8 430 to layer 5 426 to indicate the new layer relationship.

At 436, after removing container image 1 414 from local storage 402, the host node runs container 406 to execute an application workload that provides a service utilizing container image 2 416 and container image 3 418. Afterward, at 438, the host node pushes updated container image 2 416 and updated container image 3 418 along with updated layer metadata 424 and updated layer metadata 428 to container image registry 404.

Figure 5:
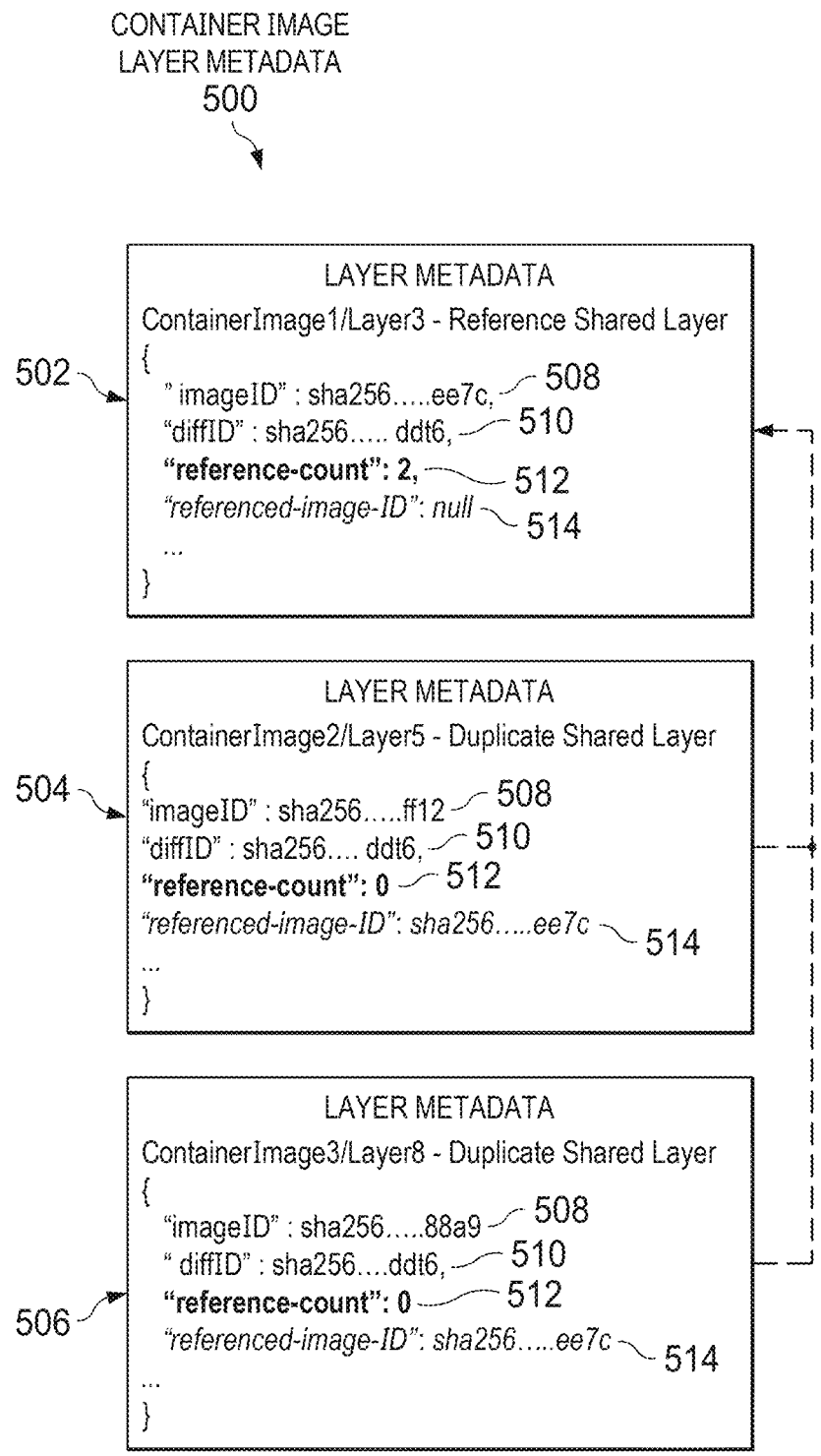
FIG. 5 is a diagram illustrating an example of container image layer metadata in accordance with an illustrative embodiment.

With reference now to FIG. 5, a diagram illustrating an example of container image layer metadata is depicted in accordance with an illustrative embodiment. In this example, container image layer metadata 500 includes layer metadata 502, layer metadata 504, and layer metadata 506. Layer metadata 502, layer metadata 504, and layer metadata 506 can be, for example, layer metadata 420, layer metadata 424, and layer metadata 428 in FIGS. 4A-4B. Similarly, layer metadata 502 corresponds to container image 1, layer 3 (e.g., layer 3 422 of container image 1 414 in FIGS. 4A-4B), which is a reference shared layer, layer metadata 504 corresponds to container image 2, layer 5 (e.g., layer 5 426 of container image 2 416 in FIGS. 4A-4B), which is a duplicate shared layer, and layer metadata 506 corresponds to container image 3, layer 8 (e.g., layer 8 430 of container image 3 418 in FIGS. 4A-4B), which also is a duplicate shared layer.

Each of layer metadata 502, layer metadata 504, and layer metadata 506 includes imageID 508, diffID 510, reference-count 512, and referenced-image-ID 514. Layer metadata of each layer includes referenced-image-ID 514 that records imageID 508 of a reference shared layer corresponding to another container image, which in this example is layer 3 of container image 1. In the context of containerization, the term imageID refers to a unique identifier that represents a specific container image layer (e.g., layer 3). Each layer in a container image has its own unique imageID. DiffID 510 identifies the difference folder. Reference-count 512 records the number to times a particular layer (e.g., layer 3) of a particular container image (e.g., container image 1) is referenced by other container image layers (e.g., layer 5 of container image 2 and layer 8 of container image 3). In this example, reference-count 512 is two for layer 3 and zero for layer 5 and layer 8.

Figure 6:
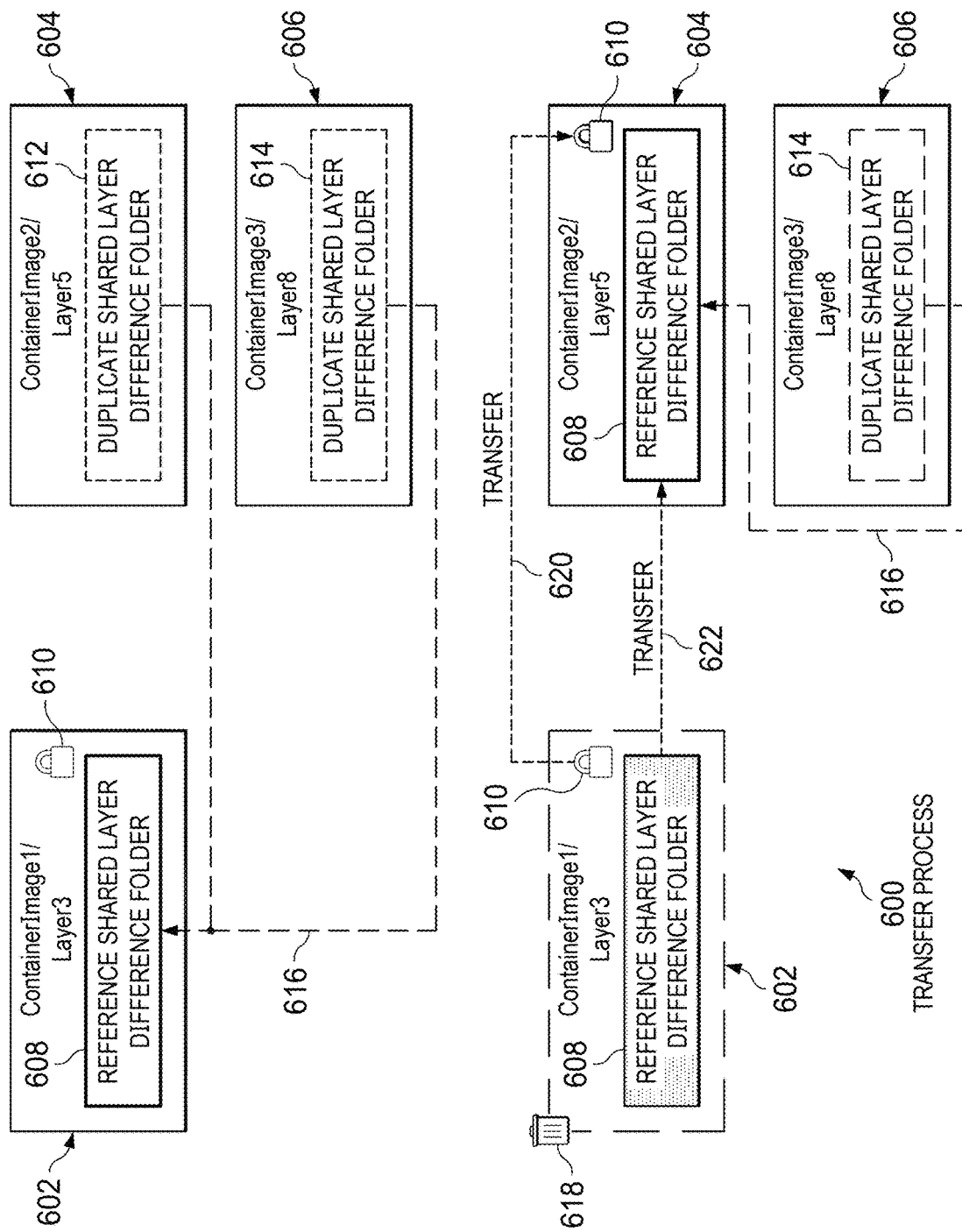
FIG. 6 is a diagram illustrating an example of a transfer process in accordance with an illustrative embodiment.

With reference now to FIG. 6, a diagram illustrating an example of a transfer process is depicted in accordance with an illustrative embodiment. Transfer process 600 is implemented in a host node, such as, for example, computer 101 in FIG. 1 or host node 202 in FIG. 2.

In this example, transfer process 600 includes container image 1, layer 3, 602, container image 2, layer 5, 604, and container image 3, layer 8, 606, such as layer 3 314 of container image 1 302, layer 5 320 of container image 2 304, and layer 8 324 of container image 3 306 in FIG. 3, which contain the same content. Also in this example, container image 1, layer 3, 602 includes reference shared layer difference folder 608 and movable shared layer reference lock 610, such as reference shared layer difference folder 316 and movable duplicate shared layer lock 318 in FIG. 3. Container image 2, layer 5, 604 includes duplicate shared layer difference folder 612, such as duplicate shared layer difference folder 322 in FIG. 3. Container image 3, layer 8, 606 includes duplicate shared layer difference folder 614, such as duplicate shared layer difference folder 326 in FIG. 3. In addition, transfer process 600 includes duplicate layer reference link 616, such as duplicate layer reference link 328 in FIG. 3, indicating the layer relationships from duplicate shared layer difference folder 612 of container image 2, layer 5, 604 and duplicate shared layer difference folder 614 of container image 3, layer 8, 606 to reference shared layer difference folder 608 of container image 1, layer 3, 602.

It should be noted that movable shared layer reference lock 610 is initially set on container image 1, layer 3, 602. However, at 618, the host node receives an input to delete container image 1, layer 3, 602. At 620, in response to receiving the input to delete container image 1, layer 3, 602, the host node transfers movable shared layer reference lock 610 from container image 1, layer 3, 602 to container image 3, layer 5, 604. Further, at 622, the host node transfers reference shared layer difference folder 608 from container image 1, layer 3, 602 to container image 3, layer 5, 604. Moreover, the host node updates duplicate layer reference link 616 to indicate the new layer relationship from duplicate shared layer difference folder 614 of container image 3, layer 8, 606 to reference shared layer difference folder 608 of container image 3, layer 5, 604.

Figure 7A:
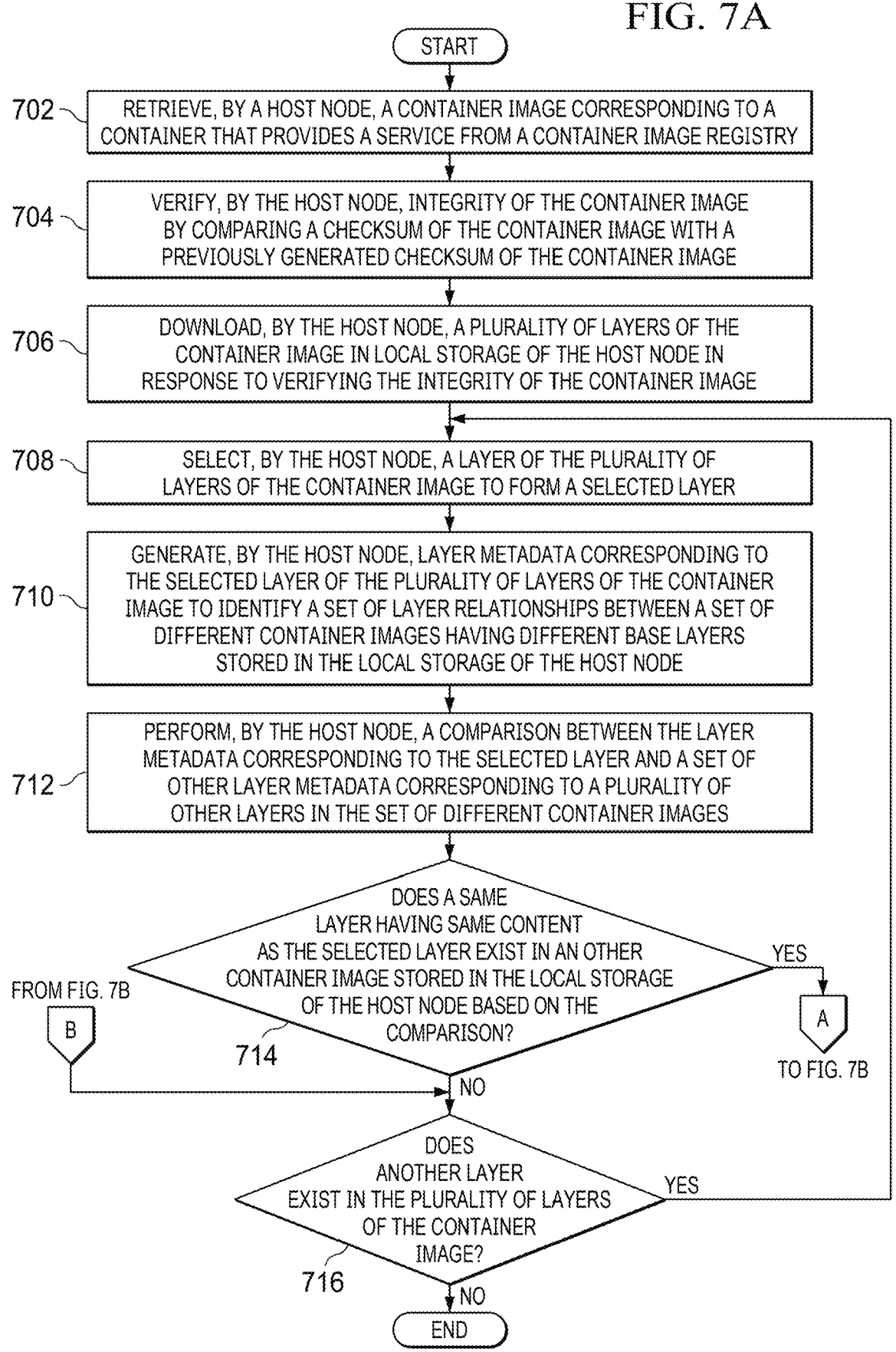
FIGS. 7A-7B are a flowchart illustrating a process for identifying duplicate shared container image layers in accordance with an illustrative embodiment.
Figure 7B:
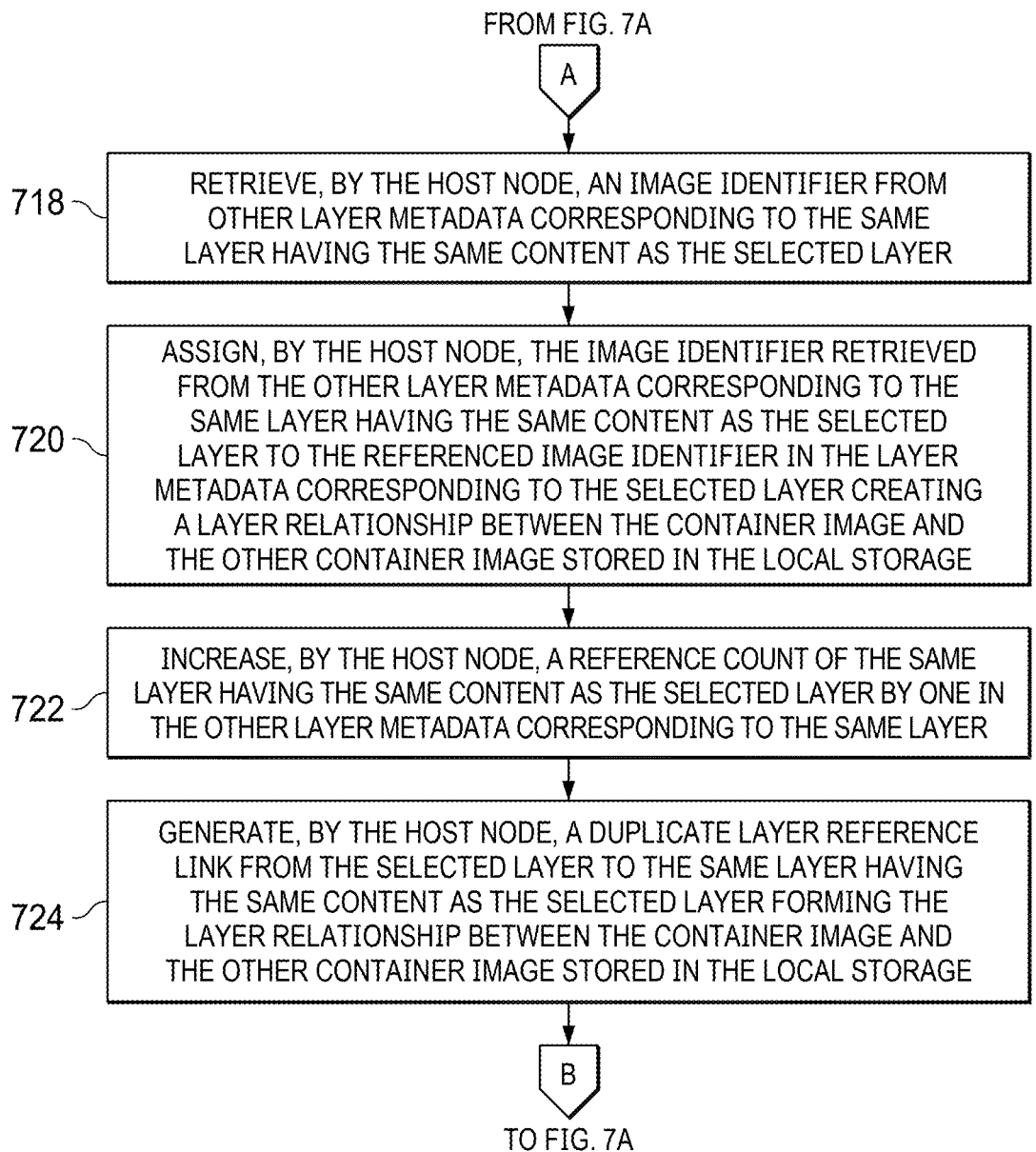

With reference now to FIGS. 7A-7B, a flowchart illustrating a process for identifying duplicate shared container image layers is shown in accordance with an illustrative embodiment. The process shown in FIGS. 7A-7B may be implemented in a host node, such as, for example, computer 101 in FIG. 1 or host node 202 in FIG. 2. For example, the process shown in FIGS. 7A-7B may be implemented by shared container image layer removal code 200 in FIG. 1.

The process begins when the host node retrieves a container image corresponding to a container that provides a service from a container image registry (step 702). The host node verifies integrity of the container image by comparing a checksum of the container image with a previously generated checksum of the container image (step 704). The host node downloads a plurality of layers of the container image in local storage of the host node in response to verifying the integrity of the container image (step 706).

The host node selects a layer of the plurality of layers of the container image to form a selected layer (step 708). The host node generates layer metadata corresponding to the selected layer of the plurality of layers of the container image to identify a set of layer relationships between a set of different container images having different base layers stored in the local storage of the host node (step 710). The host node performs a comparison between the layer metadata corresponding to the selected layer and a set of other layer metadata corresponding to a plurality of other layers in the set of different container images (step 712).

The host node makes a determination as to whether a same layer having same content as the selected layer exists in another container image stored in the local storage of the host node based on the host node performing the comparison between the set of different container images having different base layers stored in the local storage (step 714). If the host node determines that a same layer having same content as the selected layer does not exist in another container image stored in the local storage of the host node based on the host node performing the comparison between the set of different container images having different base layers stored in the local storage, no output of step 714, then the host node makes a determination as to whether another layer exists in the plurality of layers of the container image (step 716). If the host node determines that another layer exists in the plurality of layers of the container image, yes output of step 716, then the process returns to step 708 where the host node selects another layer in the plurality of layers of the container image. If the host node determines that another layer does not exist in the plurality of layers of the container image, no output of step 716, then the process terminates thereafter.

Returning again to step 714, if the host node determines that a same layer having same content as the selected layer does exist in another container image stored in the local storage of the host node based on the host node performing the comparison between the set of different container images having different base layers stored in the local storage, yes output of step 714, then the host node retrieves an image identifier from other layer metadata corresponding to the same layer having the same content as the selected layer (step 718). The host node assigns the image identifier retrieved from the other layer metadata corresponding to the same layer having the same content as the selected layer to the referenced image identifier in the layer metadata corresponding to the selected layer creating a layer relationship between the container image and the other container image stored in the local storage (step 720). In addition, the host node increases a reference count of the same layer having the same content as the selected layer by one in the other layer metadata corresponding to the same layer (step 722). Further, the host node generates a duplicate layer reference link from the selected layer to the same layer having the same content as the selected layer forming the layer relationship between the container image and the other container image stored in the local storage (step 724). Thereafter, the process returns to step 716 where the host node determines whether another layer exists in the plurality of layers of the container image.

Figure 8A:
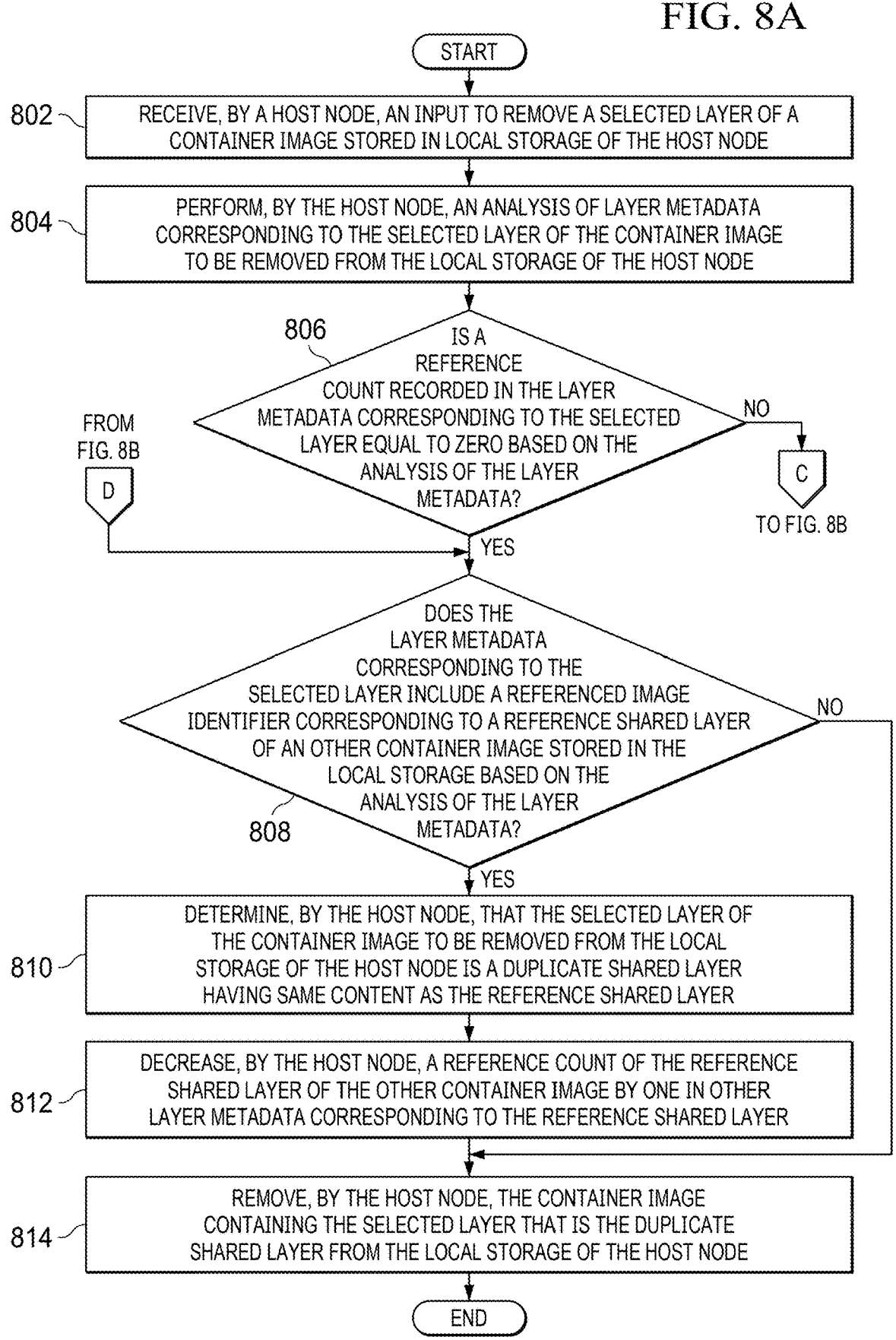
FIGS. 8A-8B are a flowchart illustrating a process for removing duplicate shared container image layers in accordance with an illustrative embodiment.
Figure 8B:
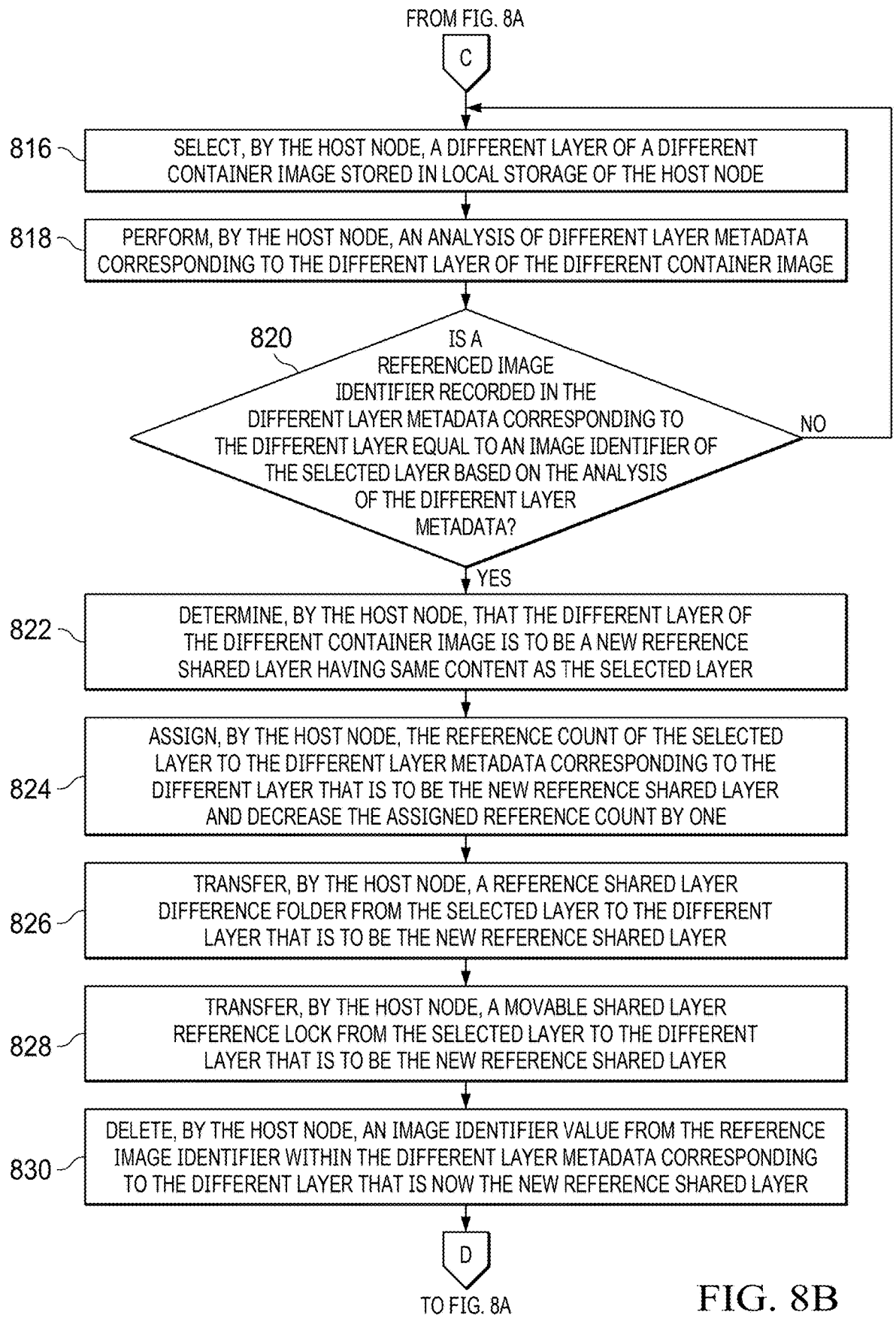

With reference now to FIGS. 8A-8B, a flowchart illustrating a process for removing duplicate shared container image layers is shown in accordance with an illustrative embodiment. The process shown in FIGS. 8A-8B may be implemented in a host node, such as, for example, computer 101 in FIG. 1 or host node 202 in FIG. 2. For example, the process shown in FIGS. 8A-8B may be implemented by shared container image layer removal code 200 in FIG. 1.

The process begins when the host node receives an input to remove a selected layer of a container image stored in local storage of the host node from a client device corresponding to a user (step 802). The host node performs an analysis of layer metadata corresponding to the selected layer of the container image to be removed from the local storage of the host node (step 804). The host node makes a determination as to whether a reference count recorded in the layer metadata corresponding to the selected layer is equal to zero based on the analysis of the layer metadata (step 806).

If the host node determines that the reference count recorded in the layer metadata corresponding to the selected layer is equal to zero based on the analysis of the layer metadata, yes output of step 806, then the host node makes a determination as to whether the layer metadata corresponding to the selected layer includes a referenced image identifier corresponding to a reference shared layer of another container image stored in the local storage based on the analysis of the layer metadata (step 808).

If the host node determines that the layer metadata corresponding to the selected layer does not include a referenced image identifier corresponding to a reference shared layer of another container image stored in the local storage based on the analysis of the layer metadata, no output of step 808, then the process proceeds to step 814. If the host node determines that the layer metadata corresponding to the selected layer does include a referenced image identifier corresponding to a reference shared layer of another container image stored in the local storage based on the analysis of the layer metadata, yes output of step 808, then the host node determines that the selected layer of the container image to be removed from the local storage of the host node is a duplicate shared layer having same content as the reference shared layer (step 810). The host node decreases a reference count of the reference shared layer of the other container image by one in other layer metadata corresponding to the reference shared layer in response to the host node determining that the selected layer of the container image to be removed from the local storage of the host node is a duplicate shared layer having same content as the reference shared layer (step 812). Afterward, the host node removes the container image containing the selected layer that is the duplicate shared layer from the local storage of the host node to decrease space utilization of the local storage, and thereby increase performance of the host node (step 814). Thereafter, the process terminates.

Returning again to step 806, if the host node determines that the reference count recorded in the layer metadata corresponding to the selected layer is not equal to zero based on the analysis of the layer metadata, no output of step 806, then the host node selects a different layer of a different container image stored in local storage of the host node (step 816). The host node performs an analysis of different layer metadata corresponding to the different layer of the different container image (step 818). The host node makes a determination as to whether a referenced image identifier recorded in the different layer metadata corresponding to the different layer is equal to an image identifier of the selected layer based on the analysis of the different layer metadata (step 820). If the host node determines that the referenced image identifier recorded in the different layer metadata corresponding to the different layer is not equal to the image identifier of the selected layer based on the analysis of the different layer metadata, no output of step 820, then the process returns to step 816 where the host node selects another different layer of the different container image stored in the local storage. If the host node determines that the referenced image identifier recorded in the different layer metadata corresponding to the different layer is equal to the image identifier of the selected layer based on the analysis of the different layer metadata, yes output of step 820, then the host node determines that the different layer of the different container image is to be a new reference shared layer having same content as the selected layer (step 822).

The host node assigns the reference count of the selected layer to the different layer metadata corresponding to the different layer that is to be the new reference shared layer and decreases the assigned reference count by one in response to the host node determining that the different layer of the different container image is to be the new reference shared layer (step 824). In addition, the host node transfers a reference shared layer difference folder from the selected layer to the different layer that is to be the new reference shared layer (step 826). Further, the host node transfers a movable shared layer reference lock from the selected layer to the different layer that is to be the new reference shared layer (step 828). Furthermore, the host node deletes an image identifier value from the reference image identifier within the different layer metadata corresponding to the different layer that is now the new reference shared layer (step 830). Afterward, the process returns to step 808 where the host node determines whether the layer metadata corresponding to the selected layer includes a referenced image identifier corresponding to a reference shared layer of another container image stored in the local storage based on the analysis of the layer metadata.

Thus, illustrative embodiments of the present disclosure provide a computer-implemented method, computer system, and computer program product for automatically identifying and removing duplicate shared layers located in different container images having different base layers within local storage of host nodes to decrease unnecessary local storage space utilize. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for shared container image layer removal, the computer-implemented method comprising:
    determining, by a host node, whether layer metadata corresponding to a selected layer of a container image includes a referenced image identifier corresponding to a reference shared layer of an other container image stored in local storage based on an analysis of the layer metadata;
    responsive to the host node determining that the layer metadata corresponding to the selected layer does include the referenced image identifier corresponding to the reference shared layer of the other container image stored in the local storage based on the analysis of the layer metadata, determining, by the host node, that the selected layer of the container image is a duplicate shared layer having same content as the reference shared layer; and
    removing, by the host node, the container image containing the selected layer that is the duplicate shared layer from the local storage to decrease space utilization of the local storage and thereby increase performance.

2. The computer-implemented method of claim 1, further comprising:
    receiving, by the host node, an input to remove the selected layer of the container image stored in the local storage;
    performing, by the host node, the analysis of the layer metadata corresponding to the selected layer of the container image to be removed from the local storage; and
    determining, by the host node, whether a reference count recorded in the layer metadata corresponding to the selected layer is equal to zero based on the analysis of the layer metadata.

3. The computer-implemented method of claim 2, further comprising:
    responsive to the host node determining that the reference count recorded in the layer metadata corresponding to the selected layer is not equal to zero based on the analysis of the layer metadata, selecting, by the host node, a different layer of a different container image stored in the local storage;
    performing, by the host node, an analysis of different layer metadata corresponding to the different layer of the different container image;
    determining, by the host node, whether the referenced image identifier recorded in the different layer metadata corresponding to the different layer is equal to an image identifier of the selected layer based on the analysis of the different layer metadata; and
    responsive to the host node determining that the referenced image identifier recorded in the different layer metadata corresponding to the different layer is equal to the image identifier of the selected layer based on the analysis of the different layer metadata, determining, by the host node, that the different layer of the different container image is to be a new reference shared layer having the same content as the selected layer.

4. The computer-implemented method of claim 3, further comprising:
    assigning, by the host node, the reference count of the selected layer to the different layer metadata corresponding to the different layer that is to be a new reference shared layer in response to the host node determining that the different layer of the different container image is to be the new reference shared layer; and
    decreasing, by the host node, the reference count assigned to the different layer metadata corresponding to the different layer that is to be the new reference shared layer by one.

5. The computer-implemented method of claim 4, further comprising:
    transferring, by the host node, a reference shared layer difference folder from the selected layer to the different layer that is to be the new reference shared layer; and
    transferring, by the host node, a movable shared layer reference lock from the selected layer to the different layer that is to be the new reference shared layer.

6. The computer-implemented method of claim 5, further comprising:
    deleting, by the host node, an image identifier value from the reference image identifier within the different layer metadata corresponding to the different layer that is now the new reference shared layer; and
    removing, by the host node, the container image containing the selected layer.

7. The computer-implemented method of claim 1, further comprising:
    retrieving, by the host node, the container image corresponding to a container that provides a service from a container image registry;
    verifying, by the host node, integrity of the container image by comparing a checksum of the container image with a previously generated checksum of the container image; and
    downloading, by the host node, a plurality of layers of the container image in the local storage in response to verifying the integrity of the container image.

8. The computer-implemented method of claim 7, further comprising:
    selecting, by the host node, a layer of the plurality of layers of the container image to form the selected layer;
    generating, by the host node, the layer metadata corresponding to the selected layer of the plurality of layers of the container image to identify a set of layer relationships between a set of different container images having different base layers stored in the local storage; and
    performing, by the host node, a comparison between the layer metadata corresponding to the selected layer and a set of other layer metadata corresponding to a plurality of other layers in the set of different container images.

9. The computer-implemented method of claim 8, further comprising:
    determining, by the host node, whether a same layer having the same content as the selected layer exists in the other container image stored in the local storage based on performing the comparison between the set of different container images having different base layers stored in the local storage;
    responsive to the host node determining that the same layer having the same content as the selected layer does exist in the other container image stored in the local storage based on performing the comparison between the set of different container images having different base layers stored in the local storage, retrieving, by the host node, an image identifier from other layer metadata corresponding to the same layer having the same content as the selected layer; and
    assigning, by the host node, the image identifier retrieved from the other layer metadata corresponding to the same layer having the same content as the selected layer to the referenced image identifier in the layer metadata corresponding to the selected layer creating a layer relationship between the container image and the other container image stored in the local storage.

10. The computer-implemented method of claim 9, further comprising:
    increasing, by the host node, a reference count of the same layer having the same content as the selected layer by one in the other layer metadata corresponding to the same layer; and
    generating, by the host node, a duplicate layer reference link from the selected layer to the same layer having the same content as the selected layer forming the layer relationship between the container image and the other container image stored in the local storage.

11. A computer system for shared container image layer removal, the computer system comprising:
    a communication fabric;
    a set of computer-readable storage media connected to the communication fabric, wherein the set of computer-readable storage media collectively stores program instructions; and
    a set of processors connected to the communication fabric, wherein the set of processors executes the program instructions to:
        determine whether layer metadata corresponding to a selected layer of a container image includes a referenced image identifier corresponding to a reference shared layer of an other container image stored in local storage based on an analysis of the layer metadata;
        determine that the selected layer of the container image is a duplicate shared layer having same content as the reference shared layer in response to determining that the layer metadata corresponding to the selected layer does include the referenced image identifier corresponding to the reference shared layer of the other container image stored in the local storage based on the analysis of the layer metadata; and
        remove the container image containing the selected layer that is the duplicate shared layer from the local storage to decrease space utilization of the local storage and thereby increase performance.

12. The computer system of claim 11, wherein the set of processors further executes the program instructions to:
    receive an input to remove the selected layer of the container image stored in the local storage;
    perform the analysis of the layer metadata corresponding to the selected layer of the container image to be removed from the local storage; and
    determine whether a reference count recorded in the layer metadata corresponding to the selected layer is equal to zero based on the analysis of the layer metadata.

13. The computer system of claim 12, wherein the set of processors further executes the program instructions to:
    select a different layer of a different container image stored in the local storage in response to determining that the reference count recorded in the layer metadata corresponding to the selected layer is not equal to zero based on the analysis of the layer metadata;
    perform an analysis of different layer metadata corresponding to the different layer of the different container image;
    determine whether the referenced image identifier recorded in the different layer metadata corresponding to the different layer is equal to an image identifier of the selected layer based on the analysis of the different layer metadata; and
    determine that the different layer of the different container image is to be a new reference shared layer having the same content as the selected layer in response to determining that the referenced image identifier recorded in the different layer metadata corresponding to the different layer is equal to the image identifier of the selected layer based on the analysis of the different layer metadata.

14. The computer system of claim 13, wherein the set of processors further executes the program instructions to:

assign the reference count of the selected layer to the different layer metadata corresponding to the different layer that is to be a new reference shared layer in response to determining that the different layer of the different container image is to be the new reference shared layer; and decrease the reference count assigned to the different layer metadata corresponding to the different layer that is to be the new reference shared layer by one.

15. The computer system of claim 14, wherein the set of processors further executes the program instructions to:

transfer a reference shared layer difference folder from the selected layer to the different layer that is to be the new reference shared layer; and transfer a movable shared layer reference lock from the selected layer to the different layer that is to be the new reference shared layer.

16. A computer program product for shared container image layer removal, the computer program product comprising a set of computer-readable storage media having program instructions collectively stored therein, the program instructions executable by a computer to cause the computer to:

determine whether layer metadata corresponding to a selected layer of a container image includes a referenced image identifier corresponding to a reference shared layer of an other container image stored in local storage based on an analysis of the layer metadata;

determine that the selected layer of the container image is a duplicate shared layer having same content as the reference shared layer in response to determining that the layer metadata corresponding to the selected layer does include the referenced image identifier corresponding to the reference shared layer of the other container image stored in the local storage based on the analysis of the layer metadata; and remove the container image containing the selected layer that is the duplicate shared layer from the local storage to decrease space utilization of the local storage and thereby increase performance.

17. The computer program product of claim 16, wherein the program instructions further cause the computer to:

receive an input to remove the selected layer of the container image stored in the local storage;

perform the analysis of the layer metadata corresponding to the selected layer of the container image to be removed from the local storage; and determine whether a reference count recorded in the layer metadata corresponding to the selected layer is equal to zero based on the analysis of the layer metadata.

18. The computer program product of claim 17, wherein the program instructions further cause the computer to:

select a different layer of a different container image stored in the local storage in response to determining that the reference count recorded in the layer metadata corresponding to the selected layer is not equal to zero based on the analysis of the layer metadata;

perform an analysis of different layer metadata corresponding to the different layer of the different container image;

determine whether the referenced image identifier recorded in the different layer metadata corresponding to the different layer is equal to an image identifier of the selected layer based on the analysis of the different layer metadata; and determine that the different layer of the different container image is to be a new reference shared layer having the same content as the selected layer in response to determining that the referenced image identifier recorded in the different layer metadata corresponding to the different layer is equal to the image identifier of the selected layer based on the analysis of the different layer metadata.

19. The computer program product of claim 18, wherein the program instructions further cause the computer to:

assign the reference count of the selected layer to the different layer metadata corresponding to the different layer that is to be a new reference shared layer in response to determining that the different layer of the different container image is to be the new reference shared layer; and decrease the reference count assigned to the different layer metadata corresponding to the different layer that is to be the new reference shared layer by one.

20. The computer program product of claim 19, wherein the program instructions further cause the computer to:

transfer a reference shared layer difference folder from the selected layer to the different layer that is to be the new reference shared layer; and transfer a movable shared layer reference lock from the selected layer to the different layer that is to be the new reference shared layer.

* * * * *